US010708001B2

(12) United States Patent
Butehorn (10) Patent No.: US 10,708,001 B2
(45) Date of Patent: Jul. 7, 2020

(54) SYSTEM AND METHOD OF LOCAL RETRANSMISSION OF TCP/IP FRAMES

(71) Applicant: Hughes Network Systems, LLC, Germantown, MD (US)

(72) Inventor: Matthew Mario Butehorn, Mount Airy, MD (US)

(73) Assignee: Hughes Network Systems, LLC, Germantown, MD (US)

(*) Notice: Subject to any disclaimer, the term of this patent is extended or adjusted under 35 U.S.C. 154(b) by 57 days.

(21) Appl. No.: 15/624,681

(22) Filed: Jun. 15, 2017

(65) Prior Publication Data
US 2018/0367256 A1 Dec. 20, 2018

(51) Int. Cl.
| H04L 1/18 | (2006.01) |
| H04L 29/06 | (2006.01) |
| H04L 29/08 | (2006.01) |
| H04L 12/741 | (2013.01) |
| H04L 5/00 | (2006.01) |
| H04L 12/66 | (2006.01) |
| H04L 1/00 | (2006.01) |

(52) U.S. Cl.
CPC .............. H04L 1/18 (2013.01); H04L 1/1809 (2013.01); H04L 1/1832 (2013.01); H04L 5/0055 (2013.01); H04L 45/74 (2013.01); H04L 67/141 (2013.01); H04L 69/16 (2013.01); *H04L 12/66* (2013.01); *H04L 2001/0097* (2013.01)

(58) Field of Classification Search
CPC ...... H04W 28/06; H04W 84/06; H04L 67/28; H04L 69/08; H04L 41/5035; H04L 43/00; H04L 47/2483
See application file for complete search history.

(56) References Cited

U.S. PATENT DOCUMENTS

| 5,434,847 A | * | 7/1995 | Kou ..................... H04B 7/212 370/252 |
| 2003/0032391 A1 | * | 2/2003 | Schweinhart ...... H04B 7/18582 455/12.1 |
| 2005/0063303 A1 | | 3/2005 | Samuels et al. |
| 2007/0276973 A1 | * | 11/2007 | Tan ........................ G06F 5/14 710/112 |

(Continued)

FOREIGN PATENT DOCUMENTS

| EP | 1863211 A2 | 12/2007 |
| WO | 2007095967 A1 | 8/2007 |

OTHER PUBLICATIONS

IEEE communications, vol. 20, TCP and MPTCP Retransmission Timeout Control for Networks Supporting WLANs, May 2016.*

(Continued)

*Primary Examiner* — Un C Cho
*Assistant Examiner* — Peter K Mak
(74) *Attorney, Agent, or Firm* — NovoTechIP International PLLC (57) ABSTRACT

A packet is received from a first link, and includes identification of a sender and a destination. An acknowledgement of receiving the packet is transmitted toward the sender, and the packet is forwarded, over a second link, toward the destination. A copy of the packet is stored in a queue. Upon detecting that the destination failed to receive the packet forwarded over the second link, the copy of the packet is retrieved from the queue and re-transmitted over the second link to the destination.

14 Claims, 8 Drawing Sheets

(56) References Cited

U.S. PATENT DOCUMENTS

| | | | |
|---|---|---|---|
| 2010/0275087 A1* | 10/2010 | Doppler | H04L 1/1614 |
| | | | 714/749 |
| 2012/0039339 A1* | 2/2012 | Kurita | H04L 45/00 |
| | | | 370/400 |
| 2014/0369189 A1* | 12/2014 | Lee | H04L 47/30 |
| | | | 370/230 |
| 2015/0009999 A1* | 1/2015 | Oguchi | H04L 63/00 |
| | | | 370/392 |
| 2015/0071273 A1 | 3/2015 | Hencinski et al. | |
| 2015/0381505 A1* | 12/2015 | Sundararaman | H04L 47/25 |
| | | | 370/235 |
| 2017/0019803 A1* | 1/2017 | Nguyen | H04W 76/10 |
| 2017/0105142 A1* | 4/2017 | Hecht | H04L 69/04 |
| 2017/0214489 A1* | 7/2017 | Jiang | H04L 1/0058 |
| 2017/0373950 A1* | 12/2017 | Szilagyi | H04L 41/5035 |
| 2018/0317156 A1* | 11/2018 | Bergstrom | H04W 40/34 |

OTHER PUBLICATIONS

International Search Report and Written Opinion dated Sep. 27, 2018 by the International Searching Authority (European Patent Office) in PCT Application PCT/US2018/037659.

* cited by examiner

SYSTEM AND METHOD OF LOCAL RETRANSMISSION OF TCP/IP FRAMES

BACKGROUND

Transmission Control Protocol/Internet Protocol (TCP/IP) is a network communication protocol in which a sender transmits a packet to a receiver, sets a timer in association with the transmission, and waits until a timeout for the receiver's acknowledgement. If the acknowledgement is not received before the timeout, or if an acknowledgement is received but indicates error, the sender retransmits the packet to the receiver.

End-to-end paths between sender and receiver in TCP/IP communications can be a sequence of links, and any of these links can drop packets. Regardless of where the drop occurs though, retransmission in an end-to-end TCP/IP communication can consume bandwidth in every link, from the sender to the receiver.

High packet drop can be exhibited, in some network applications, in the last link or loop to the receiver, or "last mile." There can be various reasons. For example, channel conditions can be degraded due to weather, radio interference, and other time-varying phenomena. In addition, upgrading to reduce packet loss in the last mile can be costly.

SUMMARY

This Summary is provided to introduce a selection of concepts in simplified forms, and which are further described in the Detailed Description section of this disclosure. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

In a general aspect, a method of reducing sender retransmission in a packet communication network can include receiving a packet from a first link, the packet identifying a sender and a destination; transmitting toward the sender an acknowledgement of receiving the packet; forwarding the packet, over a second link, toward the destination; and based at, least in part on receiving the packet from the first link, storing a copy of the packet in a queue, as a queued copy of the packet; and detecting an event indicative of the destination failing to receive the packet forwarded over second link and, in response, retransmitting the packet based on the queued copy of the packet.

In another general aspect, an apparatus for reducing sender retransmission in a packet communication network can include a queue; an interface to a first network, configured to receive Transmission Control Protocol/Internet Protocol (TCP/IP) packet from the first network, identifying a sender, and identifying a destination, and to transmit into the first network, toward the sender, an acknowledgement of having received the TCP/IP packet. In an aspect, the interface to the first network can be, configured to store a copy of the packet in the queue, based at least in part on the interface to the first network receiving the TCP/IP packet. In an aspect, the apparatus can include a local transmit and retransmit logic, configured to receive the TCP/IP packet from the interface to the first network, transmit the TCP/IP packet into a second network, toward the destination, and receive an indicator from the second network that the destination did not receive TCP/IP packet and, in response, retrieve the copy of the packet from the queue and retransmit the copy into the second network, toward the destination.

BRIEF DESCRIPTION OF THE DRAWINGS

The figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present subject matter may be practiced without such details. In other instances, well-known methods, procedures, components, and/or circuitry are described at a relatively high-level, without detail, to avoid unnecessarily obscuring aspects of the disclosed subject matter.

Figure 1:
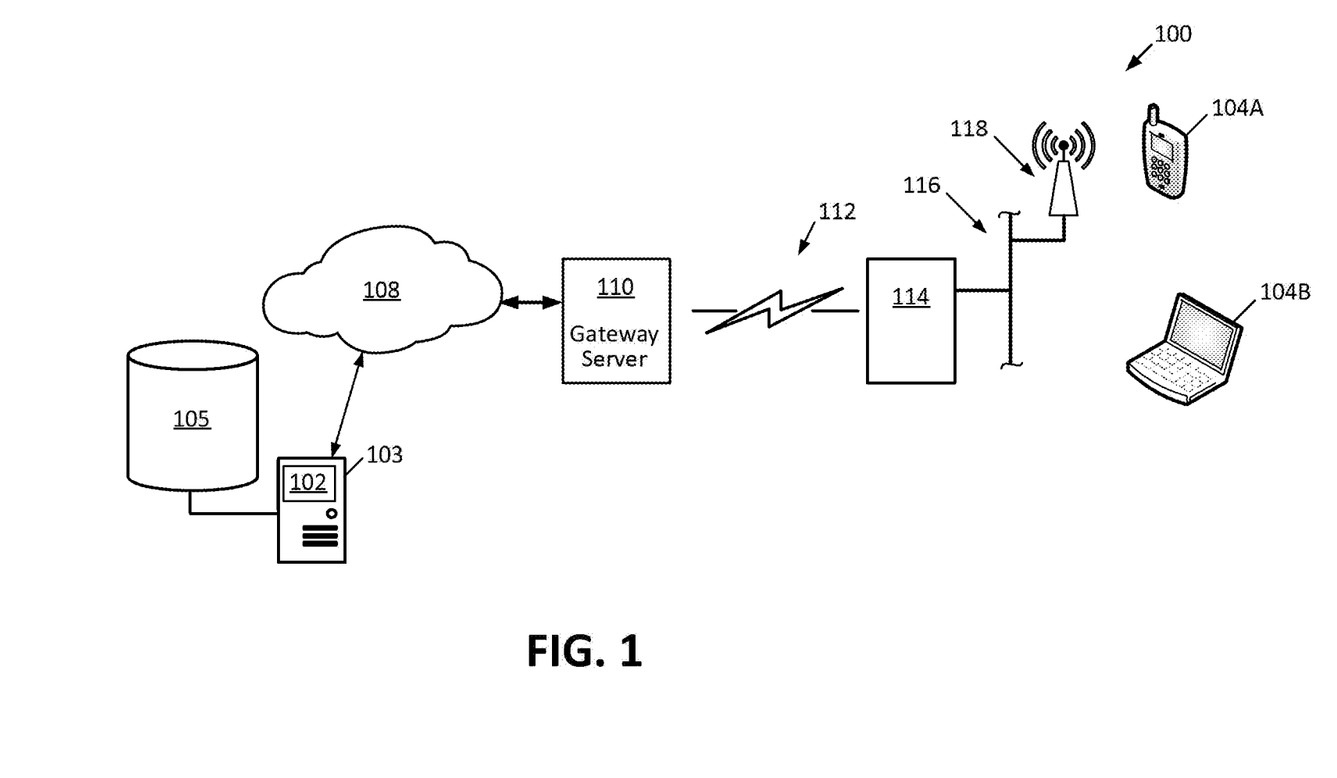
FIG. 1 illustrates an example of a communication system for end-to-end TCP/IP communication.

FIG. 1 is a high level logic block diagram of a system 100 configured to provide conventional end-to-end TCP/IP transmission, from a host application 102 supported on a server 103, to one or more client applications (not separately visible) residing, for example, on an end user device such as a smart phone 104A or laptop 104B. For brevity, "host application 102" will be referred to as "host 102," and the one or more client applications will be generically referred to as "client 104" or "clients 104" (not separately labeled on FIG. 1). The host 102 can couple, through the server 103, to a database 105. The host 102 can interface a network 108, for example, the Internet or another wide area network (WAN). The host 102 can be provided with access, for example through the network 108 and a gateway server 110, to a distribution link 112. The system 100 can include a remote link interface 114, which can be arranged between a remote end of the distribution link 112 and a local or "last loop" network 116.

In certain applications, the distribution link 112 can be a high expense link, for example, a satellite link providing terrestrial spot beams (not explicitly visible in FIG. 1) covering very small aperture terminals (VSATs) (not explicitly visible in FIG. 1). In implementations using a VSAT system as the distribution link 112, an example remote link interface 114 can include an antenna (not visible in FIG. 1), radio frequency (RF) transceiver (not visible in FIG. 1), digital modulator-demodulator (not visible in FIG. 1), and decoder (not visible in FIG. 1). This example remote link interface 114 can be according conventional VSAT techniques and, therefore, further detailed description is omitted. A "last mile" or "last loop" network 116 can connect the remote link interface 114 to the clients 104. The last loop network 116 can include, for example, a WiFi or wireless router 118, configured to establish wireless links to the clients 104.

Figure 2:
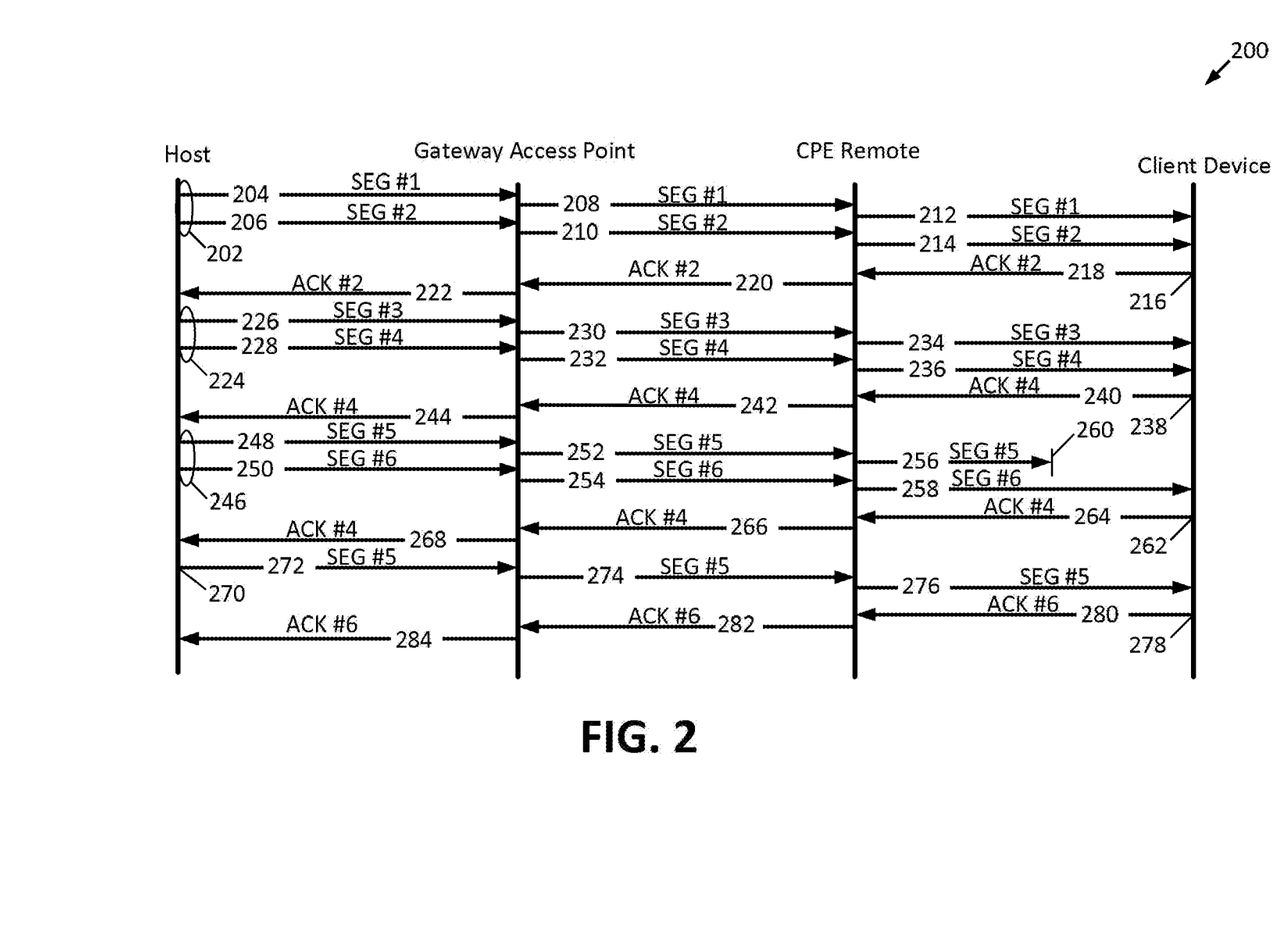
FIG. 2 illustrates example operations of conventional TCP/IP transmission and retransmission on the FIG. 1 communication system.

FIG. 2 shows a diagram 200 illustrating example TCP/IP transmission from the host 102 to a particular one of the clients 104, which will be referred to as "the destination client 104," and illustrating an example retransmission in response to a packet loss. Description arbitrarily assumes a two-packet "window," meaning the host 102 expects the destination client 104 to acknowledge two packets per TCP/IP ACK. Referring to FIG. 2, an example can start with the host 102 sending, at 202, packets SEG1 and SEG2 into the network 108, each addressed to the destination client 104. Associated with the sending of SEG1 and SEG2, the host 102 can start a timer (not visible in FIG. 2), which will be arbitrarily referenced for this description as a "window timer." The network 108 can carry SEG1 and SEG2, as transmissions 204 and 206, to the gateway server 110. The transmissions 204 and 206 can be according to conventional techniques for propagating TCP/IP packets and, therefore, detailed description is omitted. The gateway server 110 can forward SEG1 and SEG2, as respective transmissions 208 and 210, over the distribution link 112 to the remote link interface 114. The transmissions 208 and 210 can be according to conventional techniques for carrying TCP/IP packets, for example, conventional techniques for TCP/IP packets over a VSAT link, and detailed description is therefore omitted. The remote link interface 114 can transmit the TCP/IP packets SEG1 and SEG2 as respective transmissions 212 and 214 over the last loop network 116 to the client 104.

In the FIG. 2 example, transmissions 212 and 214 are assumed successful, i.e., SEG1 and SEG2 are received at the destination client 104. At 216, the destination client 104 transmits a corresponding acknowledgement, labeled "ACK2," to the host 102. ACK2 can be generated according to conventional TCP/IP ACK techniques, and therefore further detailed description is omitted. After hops 218, 220, and 222, ACK2 reaches the host 102. Assuming ACK2 is received before expiration of the SEG1 and SEG2 window timer, the host 102, at 224, sends two more TCP/IP packets, "SEG3" and "SEG4", into the network 108 and sets a corresponding "SEG3" and "SEG4" window timer. The network 108 carries SEG3 and SEG4, as TCP/IP transmissions 226 and 228, to the gateway server 110, which forwards these packets as transmissions 230 and 232, over the distribution link 112, to the remote link interface 114. The remote link interface 114 transmits SEG3 and SEG4 as TCP/IP transmissions 234 and 236 over the last loop network 116 to the client 104. Transmissions 234 and 236 are successful and the destination client 104, at 238, transmits acknowledgement, labeled "ACK4." After hops 240, 242, and 244, the host 102 receives ACK4. Assuming ACK4 is received before expiration of the SEG3 and "SEG4" window timer, the host 102 releases the timer and, at 246, sends two more TCP/IP packets, "SEG5" and "SEG6", into the network 108, addressed to the destination client 104. Associated with the sending at 246 the host 102 can set a "SEG5" and "SEG6" window timer. The network 108 carries SEG5 and SEG6, as transmissions 248 and 250, to the gateway server 110, which forwards the packets as transmissions 252 and 254 over the distribution link 112 to the remote link interface 114. The remote link interface 114 then transmits SEG5 and SEG6 as transmissions 256 and 258 over the last loop link 116 toward the destination client 104.

In this instance, though, only transmission 258 is successful. Transmission 256 of SEG5 ends at packet drop event 260. The destination client 104 therefore detects "SEG6" being out of sequence and responds, at 262, with a repeat of ACK4 modified according to conventional SACK techniques to acknowledge only SEG6 was received. As will be understood by persons of ordinary skill, the SACK acknowledgement of an out-of-order SEG6 can be omitted, but the cost can include having to retransmit both SEG5 and SEG6, even though SEG6 was received.

After hops 264, 266, and 268, the host 102 receives the repeated and modified ACK4 acknowledging receipt of SEG6, albeit out of order and, in response, the host 102 proceeds to 270 to retransmit SEG5. The retransmission, after hops 272, 274, and 276 is received at the destination client 104 and, assuming the retransmission is successful, the client destination 104 responds at 278 by transmitting acknowledgement, ACK6, indicating that SEG5 and SEG6 have been successfully received. After hops 280, 282, and 284, the host 102 receives ACK6, whereupon it can continue with packet transmissions and retransmissions when necessary, as described above.

As can be seen in FIG. 2, although the drop event 260 was in the last loop network 116, retransmission hops 272 and 274 occupied bandwidth in the network 108 and in the distribution link 112. As described, the distribution link 112 can be a high cost link.

Applicant discloses systems and methods that overcome the above-identified problem of bandwidth costs incurred on expensive links due to packet losses in last loop links.

Figure 3:
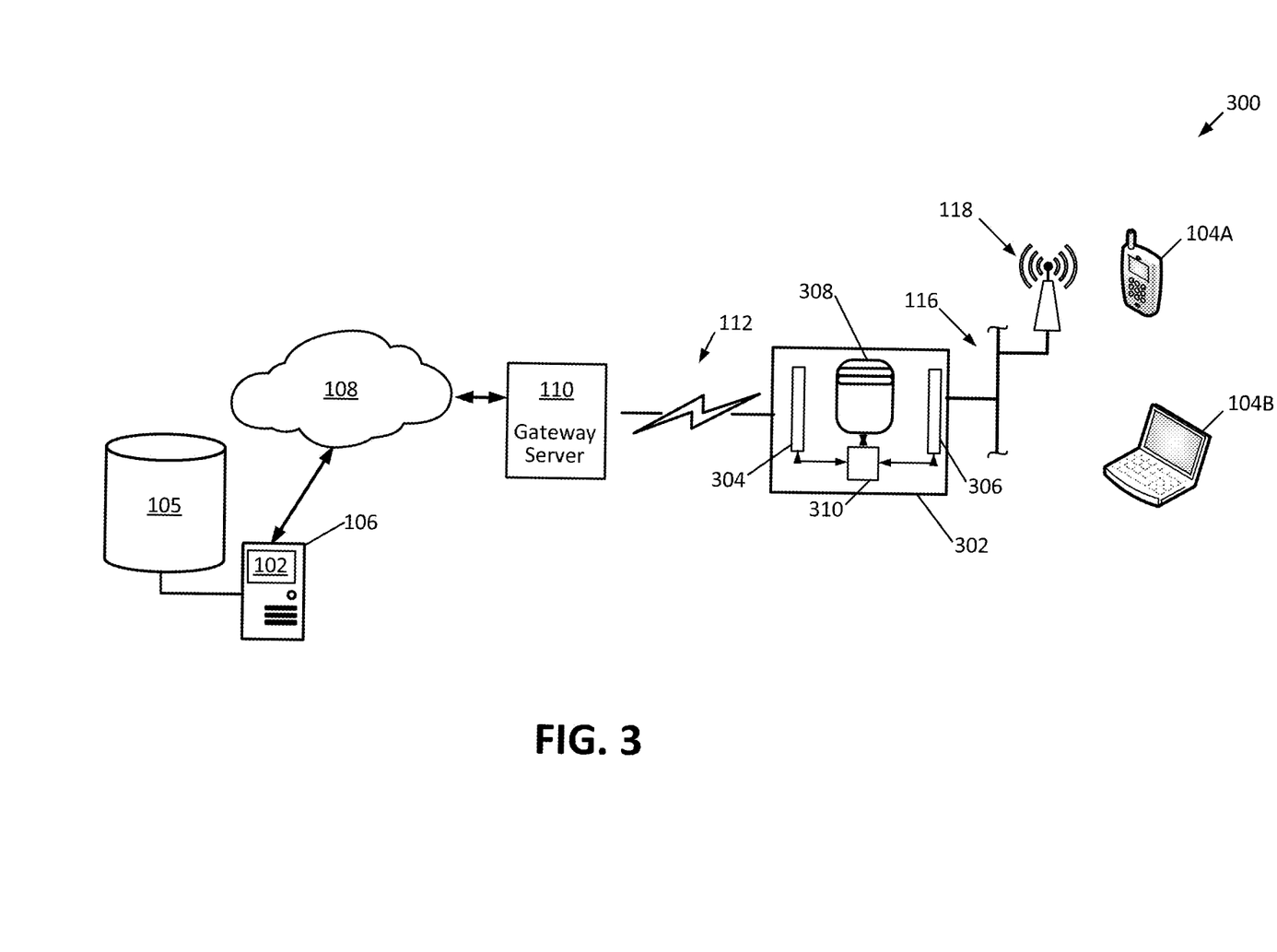
FIG. 3 illustrates one example system for end-to-end TCP/IP communication with link conserving local TCP/IP retransmission.

FIG. 3 is a diagram illustrating one example implementation of a system 300 for remote TCP/IP packet drop detection and remote retransmission according to various aspects. The FIG. 3 implementation adapts portions of the FIG. 1 system 100. This is for convenience, and is not intended to limit practices of the present concepts to such an implementation.

Referring to FIG. 3, system 300 includes a remote TCP/IP packet drop detection and retransmission apparatus 302, arranged between the last loop network 116 and the distribution link 112. FIG. 3 shows the remote TCP/IP packet drop detection and retransmission apparatus 302 replacing the remote link interface 114. However, this is not intended as a limitation, and example implementations include incorporating the described structures and functionality of the remote TCP/IP packet drop detection and retransmission apparatus 302 into, or as a combination with the remote link interface 114. The remote TCP/IP packet drop detection and retransmission apparatus 302 can include a TCP/IP ACK logic 304. In an aspect, the TCP/IP ACK logic 304 can be configured to receive host 102 TCP/IP packets addressed to one of the clients 104 and to respond to successful receipt at the logic 304 with ACK acknowledgement back to the host 102. The TCP/IP ACK logic 304 can also be configured to respond to out-of-order TCP/IP packets by sending a SACK back to the host 102, and of course to send no ACK or SACK in the event a host 102 TCP/IP packet is dropped before arriving at the logic 304. Also, in an aspect, the TCP/IP ACK logic 304 can be configured to form the ACK or SACK to appear, at the host 102, as if sent by the destination client 104. Accordingly, the remote TCP/IP packet drop detection and retransmission apparatus 302 can be transparent to the host 102.

In an aspect, the TCP/IP ACK logic 304 can also be coupled to a logic 306 that for purposes of description will be arbitrarily referred to as a "local TCP/IP packet drop detection and transmission/retransmission logic 306," and to a queue 308. The queue 308 can be configured, as will be described in greater detail later in this disclosure, to queue host 102 TCP/IP packets for retransmission, by the remote TCP/IP packet drop detection and retransmission apparatus 302, in the event of being detected by the apparatus 302 as being dropped in the last loop network 116. The queue 308 can therefore be alternatively referred to as a "local retransmission queue" 308. It will be understood that the term "local," as used in the arbitrary reference names "local TCP/IP packet drop detection and transmission/retransmission logic" 306 and "local retransmission queue" 308, refer to locality with respect to the remote TCP/IP packet drop detection and retransmission apparatus 302. It will be understood that relative to the host 102, the logic 306 could be alternatively referred to as a "remote TCP/IP packet drop detection and transmission/retransmission logic" 306, and the queue 308 could be alternatively referred to as a "remote retransmission queue" 308.

In an aspect, the TCP/IP ACK logic 304 can be configured to respond to receipt of a window of host 102 TCP/IP packets by both: (i) providing the packets to the local TCP/IP packet drop detection and transmission/retransmission logic 306 for transmission over the last loop network 116 to the destination client 104; and (ii) temporarily queueing host 102 TCP/IP packets in the local retransmission queue 308, for retrieval and retransmission over the last loop network 116 in the event acknowledgement of successful reception is not received at the remote TCP/IP packet drop detection and retransmission apparatus 302 from the destination client 104. Also, in an aspect, a queue manager 310 can be configured to monitor a fill state of the local retransmission queue 308. The monitoring can include switching a FILL flag between a full and not-full state. As will be described in greater detail later in this disclosure, the local TCP/IP packet drop detection and transmission/retransmission logic 306 can be configured to perform queueing of host 102 TCP/IP packets subject to there being space available, for example, as indicated by the FILL flag, in the local retransmission queue 308.

Accordingly, in an implementation, the remote TCP/IP packet drop detection and retransmission apparatus 302 can respond to receipt of a TCP/IP packet from the host 102 by providing the packets to the local TCP/IP packet drop detection and transmission/retransmission logic 306 for transmission over the last loop network 116 to the destination client 104, setting timers in association with the transmission, determining if there is space available in the local retransmission queue 308 (for example as indicated by an off state of the FILL flag) and, if so, loading a copy of the host 102 TCP/IP packet into the queue 308. In an aspect, the local TCP/IP transmission/retransmission logic 306 can then wait, for example, until expiration of the timers described above, for TCP/IP acknowledgement (e.g., ACK) from the client 104 that the host 102 packets sent earlier to the client 104 were received. In an implementation, the local TCP/IP transmission/retransmission logic 306 can be configured to respond to timely-received ACKs (e.g., before timeout) from the destination client 104 indicating successful receipt of earlier-sent TCP/IP packets by deleting the packets from the local retransmission queue 308.

The local TCP/IP packet drop detection and transmission/retransmission logic 306 can be configured such that upon expiration of the timer, or upon receiving from the destination client 104 a TCP/IP selective acknowledgement (SACK) message that indicates packets were received out of order, the logic 306 reads the copies of the host 102 packets from the local retransmission queue 308 and retransmits the copies to the destination client 104.

It will be appreciated that the remote TCP/IP packet drop detection retransmission apparatus 302 can be transparent to the host 102 and to the destination client 104. For example, the remote TCP/IP packet drop detection retransmission apparatus 302 can be configured to not interfere with TCP/IP protocol communications during establishment of a connection between the host 102 and the destination client 104. Then, in TCP/IP packet transmissions on the connection, the remote TCP/IP packet drop detection retransmission apparatus 302 sends ACK, or SACK acknowledgments to the host 102 that appear, to the host 102, as if send by the destination client 104. From the perspective of the destination client 104, its ACK or SACK acknowledgments cause retransmissions identical to having been sent by the host 102.

Figure 4:
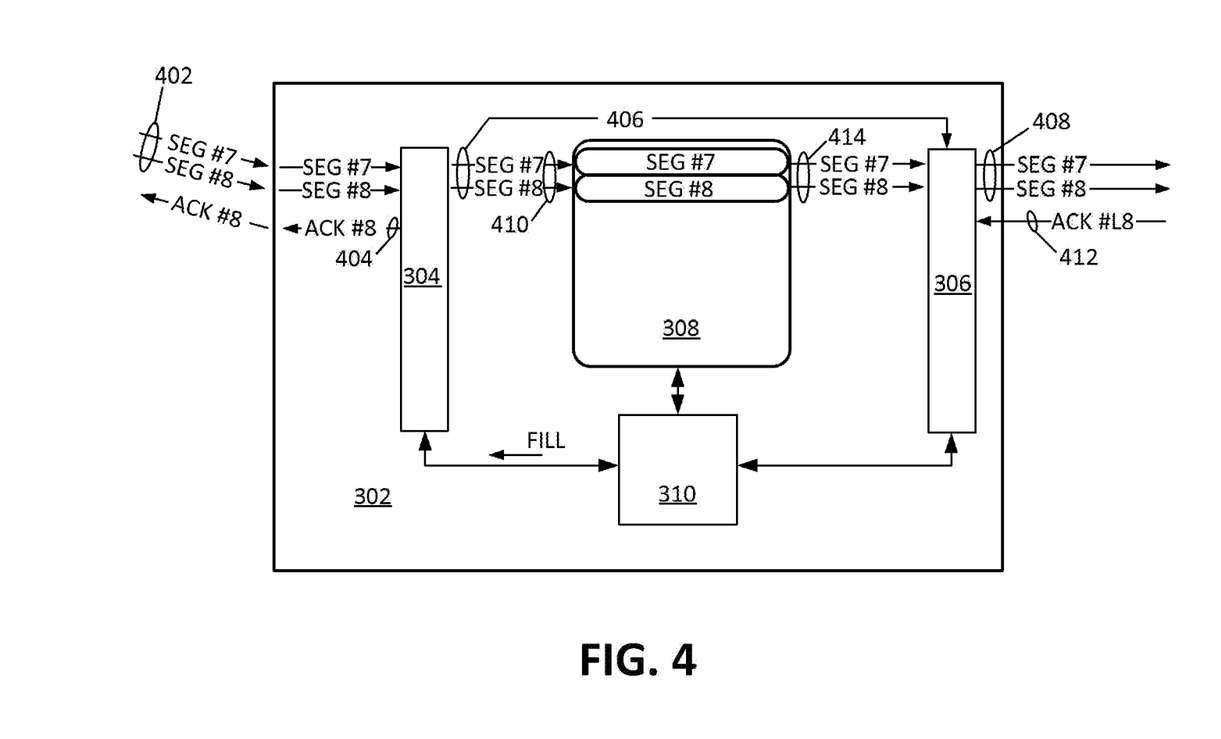
FIG. 4 illustrates example operations in end-to-end TCP/IP communications on the FIG. 3 system.

FIG. 4 illustrates example operations in end-to-end TCP/IP communications on the FIG. 3 system. Description assumes the TCP/IP ACK logic 304 has knowledge that host 102 is using a window size of two, and that the queue manager 310 has reset the FILL flag to indicate a not-filled condition. Referring to FIG. 4, it will be assumed that prior to 402 the host 102 transmitted SEG7 and SEG8 into the network 108, and the network 108 routed SEG7 and SEG8 to the gateway server 110. The gateway server 110 can then transport SEG7 and SEG8 over the distribution network 112 and, at 402, the TCP/IP ACK logic 304 receives SEG7 and SEG8. Description will assume that SEG7 and SEG8 are received in order and in a decodable condition. Accordingly, at 404 the TCP/IP ACK logic 304 can transmit acknowledgement ACK8 to the host 102, and at 406 can load SEG7 and SEG8 into the local TCP/IP packet drop detection and transmission/retransmission logic 306 for transmission to the client 104. Generation of ACK8 can be according to conventional TCP/IP ACK techniques and, therefore, further detailed description is omitted.

At 408 the logic 306 can transmit SEG7 and SEG8 into the last loop network 116. The transmission at 408 can include, in accordance with conventional TCP/IP protocol, initializing and starting a window timer for SEG7 and SEG8. The window timer can be configured with a timeout based on the time for SEG7 and SEG8 to be received by the client 104; time for the client 104 to determine the reception is successful; time for the client 104 to generate an appropriate ACK signal; and time for the ACK signal to travel back to the local TCP/IP packet drop detection and transmission/retransmission logic 306. These times can be readily determined by persons of ordinary skill having possession of this disclosure, by applying conventional TCP/IP techniques.

It will be understood that neither the order of the reference numbers 404, 406, and 408, nor the order of describing generating ACK8, loading SEG7 and SEG8 into the local TCP/IP packet drop detection and transmission/retransmission logic 306, and transmission of SEG7 and SEG8 to the client 104 are to be construed as any limitation on, or as any statement of preference regarding relative ordering of these operations, or as any statement that these operations should be separate and distinct.

In this example, the FILL flag is assumed to indicate space in the local queue 308. Therefore, in association with receiving SEG7 and SEG8, the remote TCP/IP dropped packet retransmission apparatus 302 can, at 410, load SEG7 and SEG8 into the local retransmission queue 308. In an example implementation, the loading at 410 can be performed by the TCP/IP ACK logic 304, or the queue manager 310, or both. As described above, associated with the transmissions at 408 of SEG7 and SEG8 into the last loop network 116, a SEG7 and SEG8 window timer was set. It will be assumed that the transmissions at 408 of SEG7 and SEG8 are successful. The client 104 can respond by generating a TCP/IP ACK, as if it were responding to the host 102. The remote TCP/IP packet drop detection and retransmission apparatus 302, does not forward the client 104 ACK to the host 102 because the TCP/IP ACK logic 304 has already sent the ACK. The TCP/IP ACK generated by the client 104 is labeled "ACKL8," to distinguish it from the ACK sent by the TCP/IP ACK logic 304.

Referring to FIG. 4, ACKL8 is received at 412, and it will be assumed that 412 is prior to timeout of the SEG7 and SEG8 window timer. In response, the local TCP/IP packet drop detection and transmission/retransmission logic 306 can delete (by operations not explicitly visible in FIG. 4) SEG7 and SEG8 from the local retransmission queue 308. It will be understood that "delete," in this context, does not necessarily require erasing a content of the local retransmission queue 308. For example, in one implementation "deleting" SEG7 and SEG8 from the local retransmission queue 308 can include releasing an assignment of space to SEG7 and SEG8, to render the space as available for over-write.

As described above, the TCP/IP ACK logic 304 can load SEG7 and SEG8 into the local retransmission queue 308 because the FILL flag indicates there is space. In an implementation, if the FILL flag indicates no space, the loading of TCP/IP packets from host 102 to client 104 can be temporarily halted. This halt state, though, can also halt local retransmission capability, because there is no queued copy of the host 102 TCP/IP packets to retransmit. In an aspect, the FIG. 3 remote TCP/IP packet drop detection and retransmission apparatus 302 can be configured to include a throttle mechanism that, for example, in response to the FILL flag indicating no space, can communicate to the host 102 to throttle down transmission of TCP/IP packets to the client 104.

Referring to FIG. 4, if instead of receiving ACKL8 at 412 the local TCP/IP packet drop detection and transmission/retransmission logic 306 received an indication that SEG7 and SEG8 were not received at the client 104, the logic 306 can retrieve, at 414, copies of SEG7 and SEG8 from the local retransmission queue 308 for retransmission to the client 104.

Figure 5:
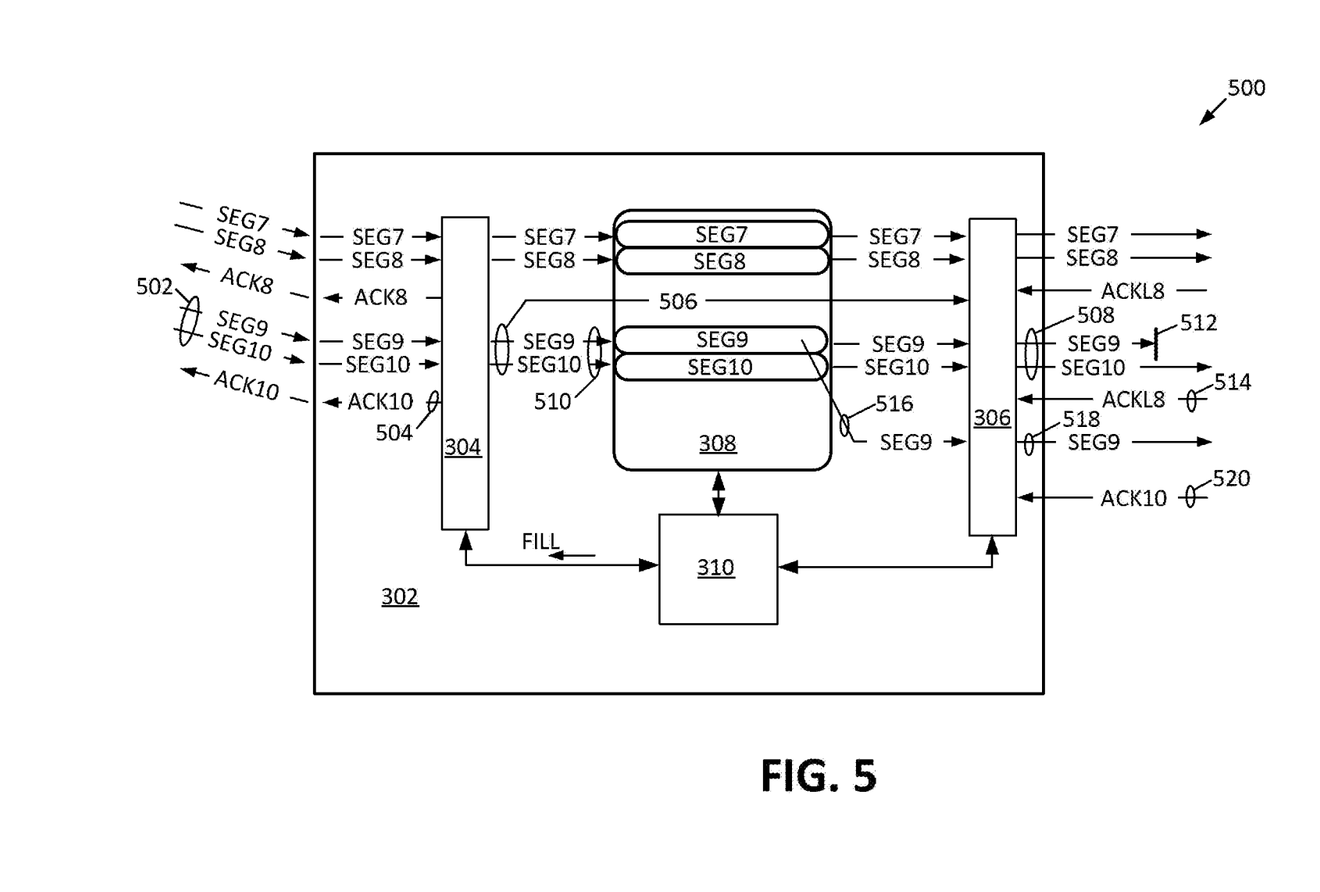
FIG. 5 illustrates example operations in end-to-end TCP/IP communications and remote TCP/IP retransmissions, on the FIG. 3 system.

FIG. 5 illustrates example operations in a flow 500 of end-to-end TCP/IP communications and a link conserving local TCP/IP retransmission, on the FIG. 3 system. Referring to FIG. 5, the flow 500 includes the above-described receipt from host 102 of SEG7 and SEG8, transmitting them to the client 104 over the last loop network 116, and storing copies of each in the local retransmission queue 308 for retransmission if necessary. It will be assumed, as in the example above, that the client 104 successfully receives SEG7 and SEG8, and therefore description of SEG7 and SEG8 need not be repeated.

Referring to FIG. 5, prior to 502 the host 102 transmits, according to TCP/IP protocol, SEG0 and SEG10 into the network 108. The network 108 routes SEG9 and SEG10 to the gateway server 110, whereupon the distribution link 112, at 502, delivers SEG9 and SEG10 to the TCP/IP ACK logic 304. Assuming SEG9 and SEG10 are received in order and in a decodable condition, the TCP/IP ACK logic 304, at 504, can generate and transmit acknowledgement ACK10 back to the host 102, and at 506 can load SEG9 and SEG10 into the local TCP/IP packet drop detection and transmission/retransmission logic 306 for transmission to the client 104. At 508 the logic 306 can transmit SEG9 and SEG10 into the last loop network 116. The transmission at 508 can include, in accordance with conventional TCP/IP protocol, setting (e.g., zeroing) and starting a window timer for SEG9 and SEG10.

As with numbers 404, 406, and 408, it will be understood that neither the order of the reference numbers 504, 506, and 508, nor the order of describing generating ACK10, loading SEG9 and SEG10 into the local TCP/IP packet drop detection and transmission/retransmission logic 306, or transmission of SEG9 and SEG10 to the client 104 are to be construed as any limitation on, or as any statement of preference regarding relative ordering of these operations, or as any statement that these operations should be separate and distinct.

The FILL flag is again assumed to indicate space in the local queue 308. Therefore, in association with SEG9 and SEG10 being successfully received, the remote TCP/IP packet drop detection and retransmission apparatus 302 can, at 510, load SEG9 and SEG10 into the local queue 308. The loading at 510 can be performed, for example, by the TCP/IP ACK logic 304, or the queue manager 310, or both.

Referring to FIG. 5, in this example, the transmissions at 508 of SEG9 and SEG10 into the last loop network 116 were not fully successful; the transmission of SEG9 ended with a packet drop event at 512. The client 104 therefore detects "SEG10" being out of sequence and responds with a repeat of ACKL8, modified to acknowledge only SEG10 was received. The acknowledgement can be omitted but, as will be understood, can lead to the remote TCP/IP packet drop detection and retransmission apparatus 302 retransmitting both SEG9 and SEG10.

At 514, the local TCP/IP packet drop detection and transmission/retransmission logic 306 receives the repeated and modified ACKL8 and, in response, proceeds to 516 to read SEG9 from the local queue 308 and, at 518, retransmits SEG9 into the last loop network 116 toward the client 104. The retransmission of SEG9 is shown as successful, and at 520 the local TCP/IP transmission/retransmission logic 306 receives ACK10, and whereupon it can continue with packet transmissions, and retransmissions when necessary, as described above.

Referring to FIG. 5, it will be appreciated that the bandwidth cost for the retransmission of SEG9 due to the drop event 512 is limited to the last loop network 114. Neither the network 108 nor the high cost distribution link 112 incurred costs. It will also be appreciated that the above-described retransmission from the remote TCP/IP packet drop detection and retransmission apparatus 302 to the client 104 does not require construction or tear-down of a TCP/IP connection between the apparatus 302 and the client 104. Likewise, neither the remote TCP/IP packet drop detection and retransmission apparatus 302 nor the client 104 need to maintain any state of any "connection" between them. Instead, as described, when the remote TCP/IP packet drop detection and retransmission apparatus 302 receives a host 102 TCP/IP packet addressed to the client 104, it can set a timer, forward the packet to the client 104 and, so long as the local retransmission queue 308 is not in a fill state, can queue a copy of the packet in the local retransmission queue 308 and wait. If there is a packet drop in the last loop network 116, the remote TCP/IP packet drop detection and retransmission apparatus 302 can be notified by the client 104 ACK (or lack of such ACK), and in response can retrieve a copy of the dropped packet from its local queue 308 and retransmit it—with essentially no cost on the distribution link 112.

Figure 6:
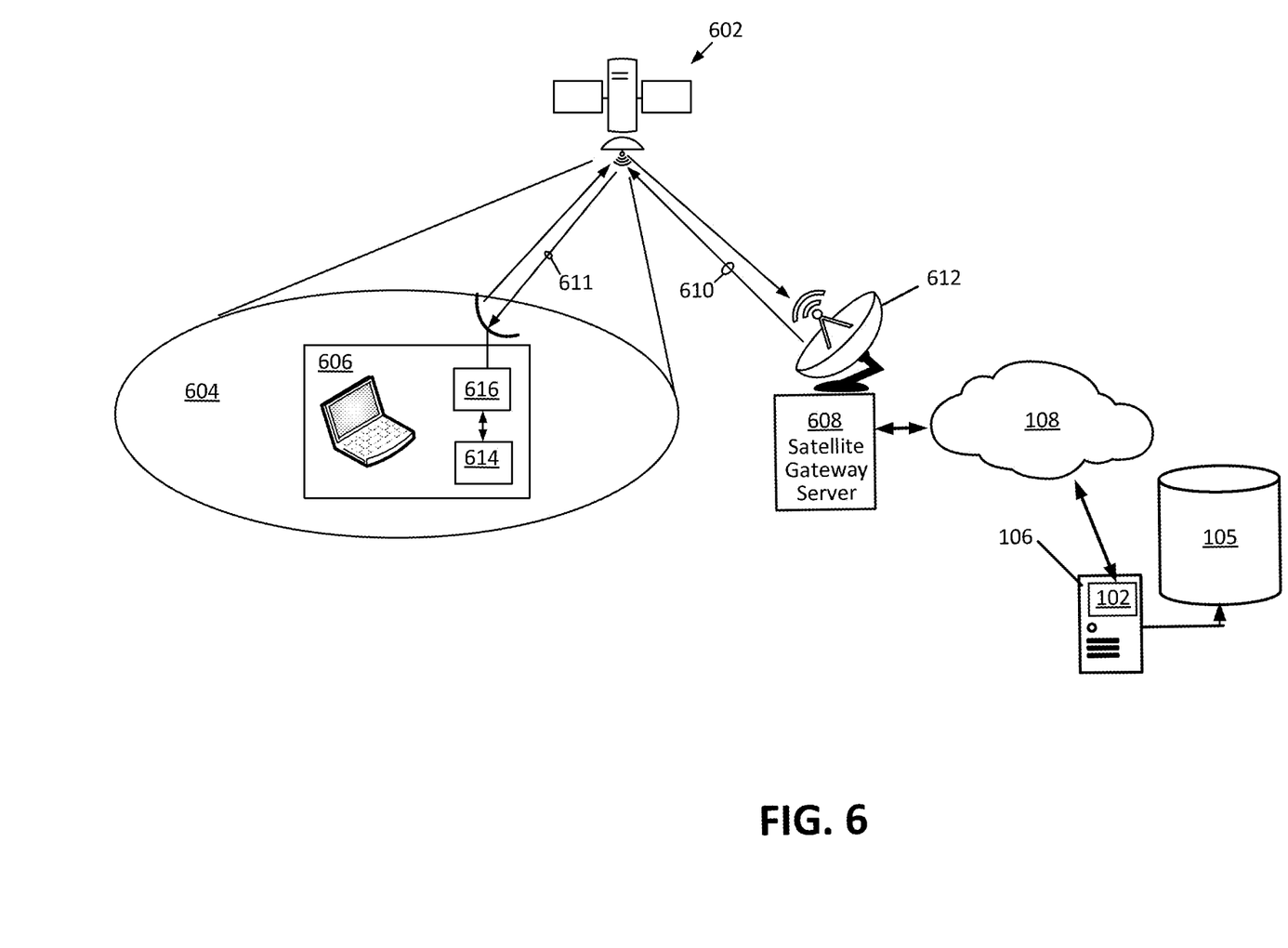
FIG. 6 illustrates an example very small aperture satellite (VSAT) implementation of an end-to-end TCP/IP communication with remote TCP/IP retransmission.

FIG. 6 illustrates an example Very Small Aperture Terminal (VSAT) system 600 for end-to-end TCP/IP communication with link conserving local TCP/IP retransmission. Referring to FIG. 6, the system 600 can include a satellite 602, which can be, for example, a space-borne High Throughput Satellite (HTS), configured to transmit data content items, for example, from the satellite gateway server 608, to remote sites via a plurality of narrowly focused regional spot beams, such as exemplary spot, beam 604. Independent data streams may be transmitted on each of the spot beams. Each spot beam can define a communication cell, with neighboring cells typically operating at different frequencies and/or polarizations, typically according to a three-color or four-color coloring scheme to allow reuse of frequencies and/or polarizations. Remote sites located within these cells, such as the exemplary remote site 606, may be adapted or configured to receive data transmissions from satellite 602 via equipment such as a VSAT.

In some implementations, more than one satellite may be used, or other types of satellites may be used, including, but not limited to, Fixed Satellite Service (FSS) and High Capacity Satellites (HiCapS). In some implementations, an aircraft such as, but not limited to, a balloon, airship, or unmanned aircraft vehicle (UAV) including the necessary communication equipment may serve as satellite 602. In some implementations, optical communication, rather than radio communication may be used between satellite 602 and remote sites and/or gateways. Satellite 602 can be configured to receive data from one or more gateway stations for retransmission via spot beams to remote sites located within cells defined by the spot beams. In the example illustrated in FIG. 6, the satellite gateway server 608 is configured to provide a feeder data stream 610 to satellite 602 via transmission antenna 612, and the satellite provides this as a downlink 611.

Referring to FIG. 6, the remote sites, such as remote site 606 may include fixed receivers (including, for example, an antenna installed on a roof of a residence or business) and/or mobile receivers (including, for example, land-based vehicles, marine vehicles, aircraft, and handheld devices). The remote site 606 can include a remote TCP/IP dropped packet retransmission unit 614 that interfaces a remote last loop network 616. The remote TCP/IP dropped packet retransmission unit 614 can be implemented, for example, according to the remote TCP/IP packet drop detection and retransmission apparatus 302 as described above and illustrated on the appended drawings. The remote last loop network 616 can be implemented, for example, according to the last loop network 116 described in reference to FIGS. 1-5.

Figure 7:
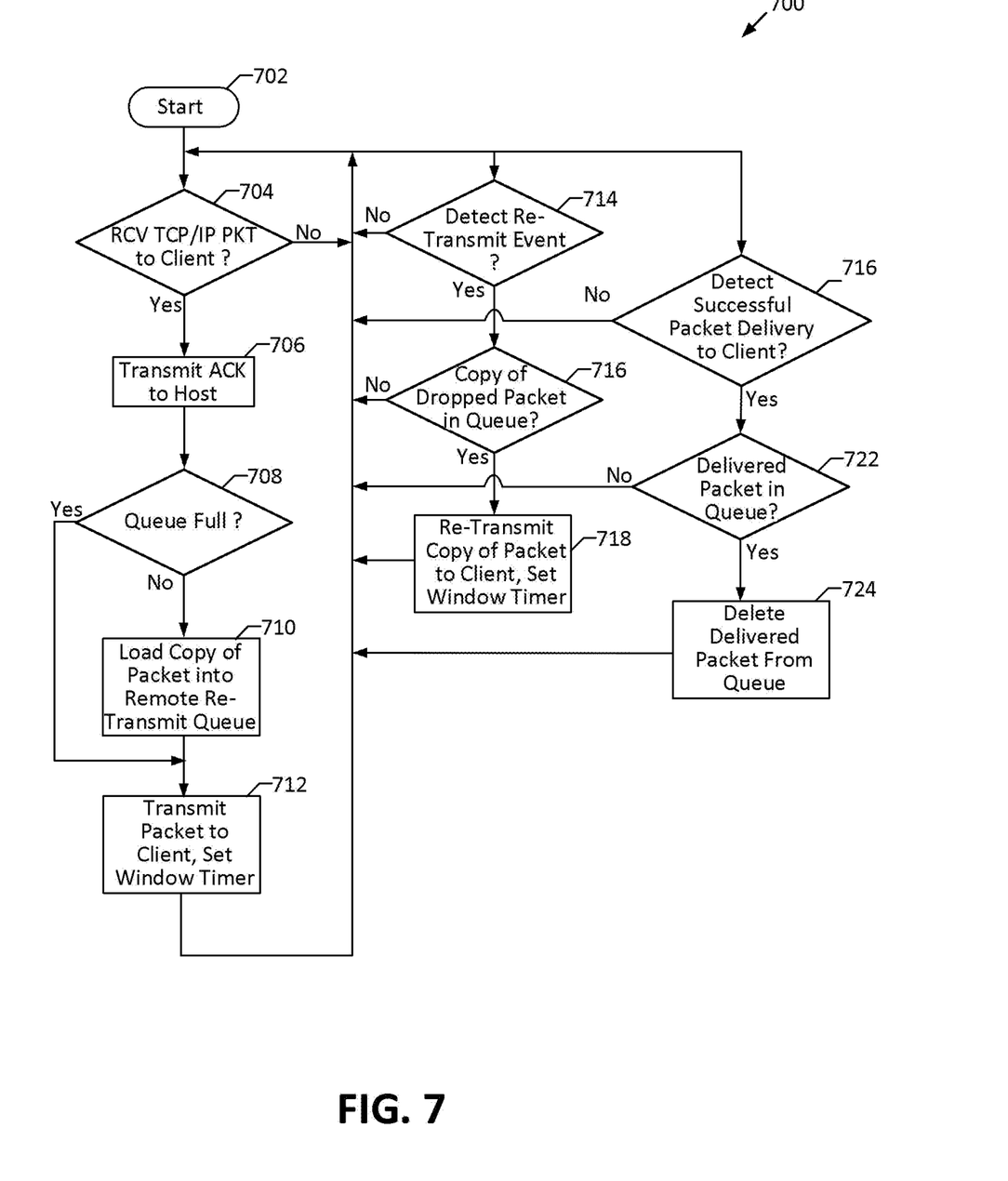
FIG. 7 shows a flow chart illustrating example operations in end-to-end TCP/IP communications and remote TCP/IP retransmission.

FIG. 7 shows a flow chart 700 illustrating example operations in end-to-end TCP/IP communications and link conserving local TCP/IP retransmission. Referring to FIG. 7, operations in the flow 700 can include a Start at 702, can then proceed to 704 and wait, at an interface between the first link and a second link, for a window of TCP/IP packets from the first link, the TCP/IP packets identifying a given sender and a given destination, and the destination being reachable through the second link. Referring to FIGS. 5 and 7, one example of operations at 704 can include receiving at the TCP/IP ACK logic 304 the TCP/IP packets SEG7 and SEG8, or the TCP/IP packets SEG9 and SEG10, from the distribution link 112, identifying the sender as host 102 and one of the clients 104 as the destination. Upon receiving the window of packets, the flow 700 can proceed to 706 and apply operations of transmitting an acknowledgement (ACK) toward the host 102 (but actually received by the local TCP/IP packet drop detection and retransmission logic 306. Referring to FIGS. 5 and 7, one example of operations at 704 can be receiving at the TCP/IP ACK logic 304 the TCP/IP packets SEG7 and SEG8, or the TCP/IP packets SEG9 and SEG10, from the distribution link 112, identifying the sender as host 102. One example of operations at 706 can be the TCP/IP ACK logic 304, at 504, generating and transmitting acknowledgement ACK10 back to the host 102.

Referring to FIG. 7, from 706 the flow 700 can proceed to 708, which is a branch decision based on whether the local queue is full. If the local queue is not full, the flow 700 can proceed to 710 and apply operations of loading the window of packets into the local queue, and then proceed to 712 and apply operations of transmitting the TCP/IP packet into the second link toward the destination. After 712, the flow 700 can return to 702, and concurrently to 714 to wait for a retransmission event. Referring to FIGS. 5 and 7, examples of operations proceeding from 708 to 712 can include the TCP/IP ACK logic 304, in response to the FILL flag indicating the local queue 308 as not full, loading at 510, into the local queue 308, copies of SEG9 and SEG10 TCP/IP packets and providing the packets to the local TCP/IP packet drop detection and transmission/retransmission logic 306 for sending into the last loop network 116 toward the destination client 104. Referring to FIG. 7, if the local queue is full at 708 the flow 700 can bypass operations 710 and proceed directly to 712 to transmit (e.g., through the local TCP/IP packet drop detection and transmission/retransmission logic 306) the packets to the destination client 104.

Regarding retransmission events at 714, referring to FIGS. 5 and 7, one example can be the local TCP/IP packet drop detection and transmission/retransmission logic 306 receiving a repeated ACK, such as the described receipt of the modified repeated ACKL8 generated by the client 104 in response to the first transmission of SEG9 ending in the packet drop at 512. Upon occurrence of a retransmission event, the flow 700 can proceed from 714 to 716, and apply operations of determining whether a copy of the dropped packet is in the local queue 308. The dropped packet can be identified by the ACK received from the client 104 or, if the event is a timeout, by the identity of the timer. If a copy is in the local queue 308, the flow 700 can proceed to 718 and apply operation of retrieving the copy from the local queue 308 and retransmitting the packet(s).

Referring to FIG. 7, when the flow 700 returns to 704, and concurrently to 714 to wait for a retransmission event, the flow can also concurrently proceed to 720 and wait for indication from the client 104 of receiving the packets. One example of such an indication can include receiving an appropriate ACK from the client 104. In response, the flow 700 can proceed to 722 and determine whether the local queue 308 stores a copy of the packet that was successfully received. If the answer at 722 is "Yes," the flow 700 can progress to 724 and apply operations of deleting the copy of the packet from the local queue, and then back to one or more of 704, 714, and 720.

Figure 8:
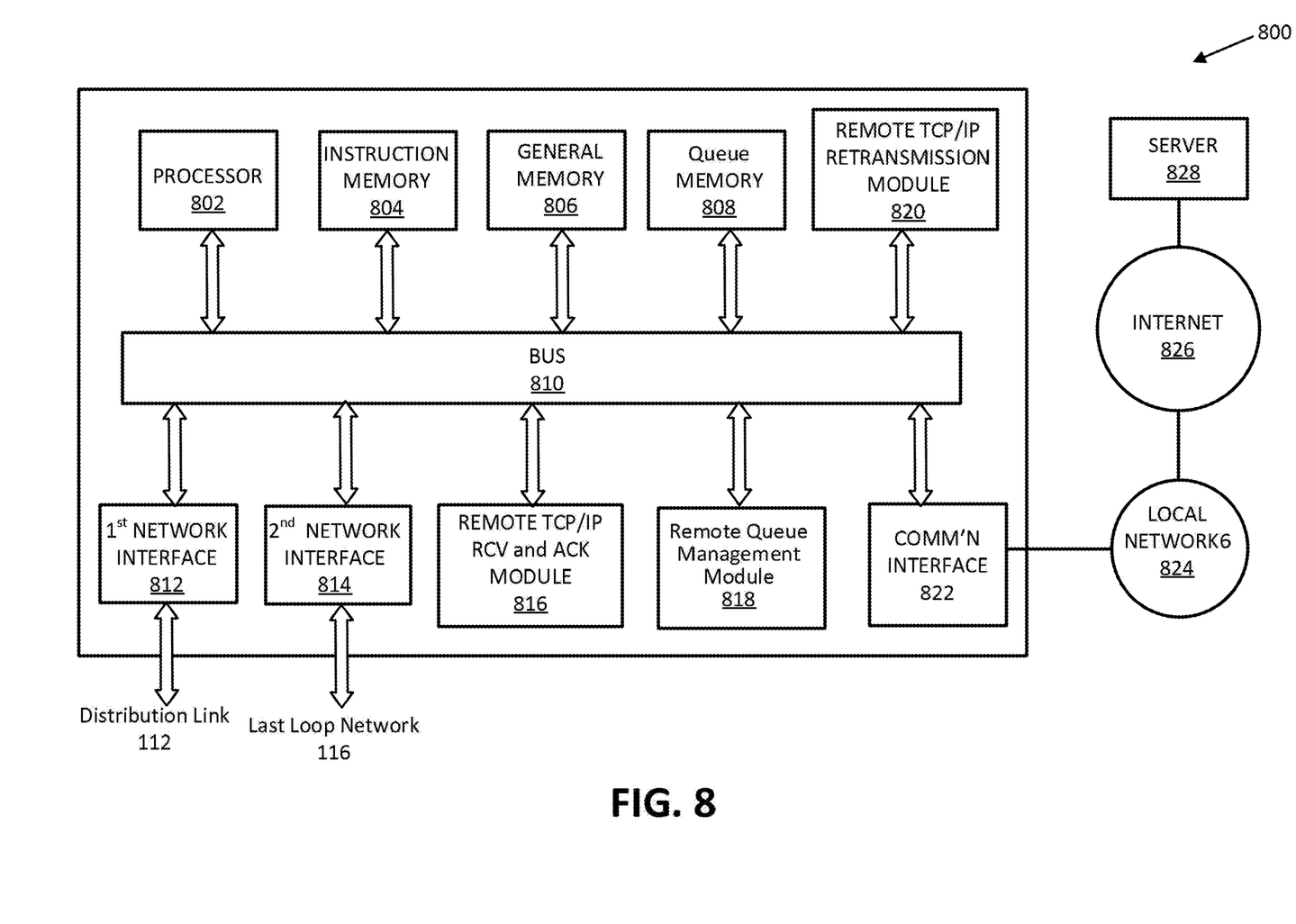
FIG. 8 is a logic block diagram that illustrates one example computer system upon which aspects of this disclosure may be implemented.

FIG. 8 is a block diagram illustrating a computer system 800 upon which aspects of this disclosure may be implemented, such as, but not limited to the processes described at FIGS. 4, 5, and 6. It will be understood that functional blocks illustrated in FIG. 8 are logical blocks, and do not necessarily correspond to particular hardware on a one-to-one basis.

Referring to FIG. 8, the computer system 800 can include a data processor 802, a general purpose memory 804, an instruction memory 806, and a queue memory 808, coupled by a bus 810. A first network interface 812 can be included, coupled for example to the bus 810, to interface with the distribution link 112. A second network interface 814, also coupled to the bus 810, can be configured to interface with the last loop network 116. The instruction memory 806 can include a tangible medium retrievably storing computer-readable instructions that when executed by the data processor 802 cause the processor to perform operations and processes including, but not limited to, as described in reference to FIGS. 3, 4, and 5. In an implementation, the computer-readable instructions can include instructions, that when executed by the data processor 802 cause the processor to perform according to the remote TCP/IP receiving-ACK module 816, the remote queue management module 818, and the remote TCP/IP retransmission module 820. The remote TCP/IP receiving-ACK module 816 can be configured, for example, to provide disclosed operations and interfaces of the FIG. 3 TCP/IP ACK logic 304, as described, for example, in reference to FIGS. 4 and 5. The remote queue management module 818 can be configured, for example, to provide functionality of the FIG. 3 queue manager 310 as described, for example, in reference to FIGS. 4 and 5. It will be understood that the respective names "remote TCP/IP receiving-ACK module," and "remote queue management module," and "remote TCP/IP retransmission module," are arbitrarily selected names, for purposes of consistent referencing, and carry no limitative weight with respect to functionality, implementations, or purposes of any block in FIG. 8 or anywhere else in this disclosure.

The computer system 800 can also include a communications interface 822 to interface with a local network 824, and the Internet 826, and to a server 828.

Example processes and operations described above, in methods and systems of TCP/IP remote packet drop detection and retransmission, refer to a TCP/IP connection between the host 102 and a single client 104, e.g., the destination client 104. IT will be understood, however that the remote TCP/IP packet drop detection and retransmission apparatus 302 and its local retransmission queue 308 can be configured to queue, detect packet drop, and retrieve for retransmission packets for hundreds, or thousands of concurrent TCP/IP connection between the host 102 and hundreds, or thousands, of clients 104.

Example implementations, as described above, arrange the remote TCP/IP packet drop detection and retransmission apparatus 1302 between the distribution link 112 and the final loop network 116. It will be understood that this is only an example, and not necessarily a limitation on practices according to this disclosure. For example, in an application where a high packet loss is exhibited in a second-to-last mile link, the remote TCP/IP packet drop detection and retransmission apparatus 302 can be arranged between that link and its preceding link.

The term "machine-readable medium" as used herein refers to any medium that participates in providing data that causes a machine to operation in a specific fashion. Forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracing of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that terms and expressions used herein have the ordinary meaning accorded to such terms and expressions in their respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify aspects of the disclosed subject matter. It is submitted with the understanding that it will not be used to interpret or limit the scope or meaning of the claims. In the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A method for reducing sender retransmission in a packet communication network, comprising:
    establishing a Transmission Control Protocol/Internet Protocol (TCP/IP) connection between a host sender and a destination client;
    transmitting a packet from the sender to a first link, the packet being a TCP/IP packet and identifying the sender and the destination client;
    receiving, at a retransmission apparatus, the packet from the first link;
    transmitting from the retransmission apparatus toward the sender, in response to the retransmission apparatus receiving the packet from the first link, a TCP/IP acknowledgement (ACK) of receiving the packet, wherein the ACK is configured to appear to the host sender as an ACK by the destination client of receiving the packet;
    based at least in part on the retransmission apparatus receiving the packet from the first link, storing a copy of the packet in a queue associated with the retransmission apparatus, as a queued copy of the packet;
    forwarding the packet over a second link, the second link being a wireless router or a WiFi, from the retransmission apparatus toward the destination client, the forwarding including transmitting the packet over the second link, and maintaining the TCP/IP connection between the sender and the destination client during the transmitting; and
    receiving at the retransmission apparatus a TCP/IP selective acknowledgement (SACK) message, sent by the destination client, the TCP/IP SACK being indicative of the destination client failing to receive the packet forwarded over the second link and, in response to said receiving the TCP/IP SACK message,
    retransmitting the packet, based on the queued copy of the packet, from the retransmission apparatus to the destination client over the second link, the retransmitting being without construction of and without maintaining of any TCP/IP connection between the retransmission apparatus and the destination client.

2. The method of claim 1, further comprising:
    receiving at the retransmission apparatus an ACK, the ACK being a TCP/ACK sent by the destination client, indicative of the destination client receiving the packet forwarded over the second link and, in response, deleting the queued copy of the packet.

3. The method of claim 1, wherein:
    retransmitting the packet, based on the queued copy of the packet, includes retrieving the queued copy of the packet from the queue, and transmitting the queued copy to the destination client.

4. The method of claim 3, wherein retransmitting the packet, based on the queued copy of the packet, is over the second link.

5. The method of claim 1, wherein:
    transmitting the packet from the host sender to the first link includes transmitting the packet into a network connected to the first link, then from the network to the first link.

6. The method of claim 5, wherein the first link includes a satellite gateway server, an uplink from the satellite gateway server to a satellite, and a downlink from the satellite to a terminal within a spot beam of the satellite.

7. The method of claim 1, further comprising:
    monitoring a fill state of the queue and, based on a result of the monitoring, switching a flag between a value indicating one among a filled state and a not-filled state and a value indicating the other among the filled state and the not-filled state.

8. The method of claim 7, wherein storing the copy of the packet in the queue is further based, at least in part, on a combination of the flag indicating the not filled state and the retransmission apparatus receiving the packet from the first link, and wherein the method further comprises:
    based, at least in part, on the flag indicating the filled state, communicating back to the host sender a request to throttle down transmission of packets.

9. The method of claim 1, wherein establishment of the TCP/IP connection between the host sender and the destination client is based on TCP/IP communications between the host sender and the destination client, and the method further includes the retransmission apparatus not interfering with said TCP/IP communications between the host sender and the destination client.

10. An apparatus for reducing sender retransmission in a packet communication network, comprising:
    a local queue;
    an interface to a first network, configured to:
        receive a Transmission Control Protocol/Internet Protocol (TCP/IP) packet from the first network, identifying a host sender and identifying a destination client,
        transmit into the first network, toward the host sender, in response to receiving the TCP/IP packet, a TCP/IP acknowledgement (ACK) of having received the TCP/IP packet, wherein the acknowledgement is configured to appear to the host sender as a TCP ACK by the destination client of receiving the TCP/IP packet, and
        store a copy of the TCP/IP packet in the local queue, based at least in part on the interface to the first network receiving the TCP/IP packet; and
    a local transmit and retransmit logic, configured to
        receive the TCP/IP packet from the interface to the first network,
        forward the TCP/IP packet over a second network toward the destination client, the second network being a wireless router or a WiFi, and
        receive an indicator from the second network that the destination client did not receive the TCP/IP packet, the indicator including a TCP/IP selective acknowledgement (SACK) message from the destination client and, in response, to
        retrieve the copy of the TCP/IP packet from the local queue and retransmit the copy toward the destination client over the second network the retransmit being without construction of and without maintaining of any TCP/IP connection between the local transmit and retransmit logic and the destination client.

11. The apparatus of claim 10, wherein the local transmit and retransmit logic is further configured to receive an ACK from the second network, the ACK being a TCP/IP ACK from the destination client and being an indication that the destination client received the TCP/IP packet and, in response, to delete the copy of the TCP/IP packet from the local queue.

12. The apparatus of claim 10, further comprising a local queue manager configured to monitor a fill state of the local queue, and based on the monitoring to set a fill flag and wherein:

the storing the copy of the TCP/IP packet in the local queue is based at least in part on a combination of the interface to the first network receiving the TCP/IP packet and the fill flag indicating the local queue is not full, and the interface to the first network is further configured to: communicate back to the host sender a request to throttle down transmission of packets, based at least in part on the fill flag indicating the local queue is full.

13. The apparatus of claim 10, wherein the local transmit and retransmit logic is configured to retransmit the copy over the second link.

14. The apparatus of claim 10, wherein the local transmit and retransmit logic is further configured to not interfere with TCP/IP communications between the host sender and the destination client in the establishment of the TCP/IP connection between the host sender and the destination client.

* * * * *